W. LOEWENSTEIN.
Wagon-Axle Lubricators.
No. 138,263. Patented April 29, 1873.
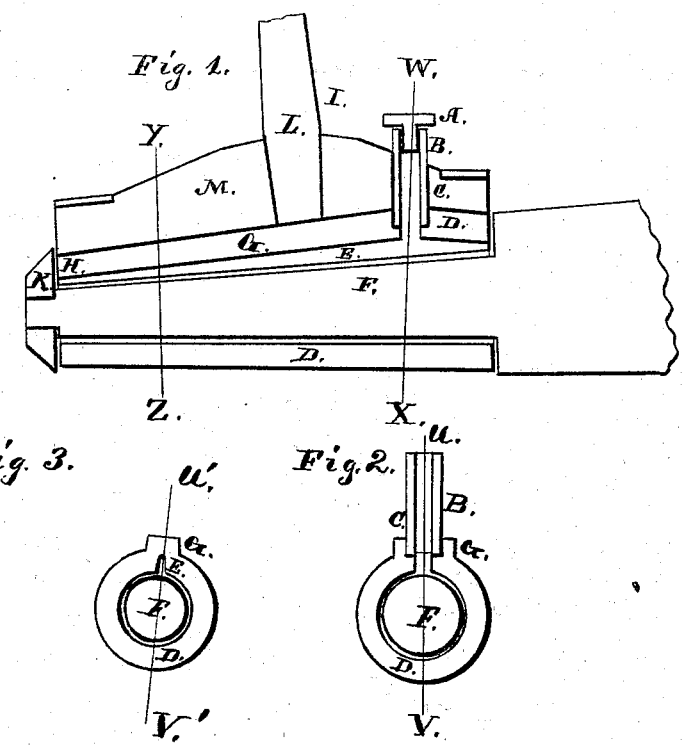

UNITED STATES PATENT OFFICE.

WILLIAM LOEWENSTEIN, OF KEOKUK, IOWA.

IMPROVEMENT IN WAGON-AXLE LUBRICATORS.

Specification forming part of Letters Patent No. 138,263, dated April 29, 1873; application filed March 19, 1872.

*To all whom it may concern:*

Be it known that I, WILLIAM LOEWENSTEIN, of Keokuk, Iowa, have made a new and useful Improvement in Axle-Lubricators, of which the following is a specification:

The object of this invention is to enable vehicle and wagon wheels to be oiled without taking off the wheel, and to do so in a practical way. The device is made as set forth hereinafter, reference being had to the accompanying drawing, in which—

Figure 1 is a longitudinal section of wheel and axle with the improvement. Figs. 2 and 3 are cross-sections of same on the lines W X and Y Z of Fig. 1.

When it is desired to oil the wheel on its axle, the cap part A is unscrewed and taken out of the pipe B. This pipe is inserted in the hub of the wheel between the inner side of the spokes and the end band. It penetrates the hub and is screwed into a part, C, of the box D, which is raised above the surface of the box in the hub. An opening passes from the pipe into the space E of the hub in which is the axle F. The oil or fluid lubricant is poured into the part B and runs into the space E onto the axle. From the opening of pipe B a channel, G, runs along the internal surface of the box D to the outer end H, and carries the oil along it to that point. The turning of the wheel a few times will also assist in distributing the oil to the end by its being carried up over the axle by this channel G, and being thus helped in its natural working that way; then the part A is screwed in again to keep out dust, &c. A short chain, I, holds part A from being lost when oiling. The pipe B guides the oil to its proper bearings and prevents its soaking through the wood. The parts can be applied to a wheel having ordinary parts by removing only the box D and inserting a new one.

I claim—

The box D with the channel G and the elevated part C, and having the pipe B opening into channel G from the outside of the hub for the introduction of lubricants, and with screw A, substantially as set forth.

WILLIAM LOEWENSTEIN.

Witnesses:
 SAML. J. WALLACE,
 ADOLPH RINKER.